(12) United States Patent
Nishibe

(10) Patent No.: US 9,167,225 B2
(45) Date of Patent: Oct. 20, 2015

(54) INFORMATION PROCESSING APPARATUS, PROGRAM, AND INFORMATION PROCESSING METHOD

(75) Inventor: Mitsuru Nishibe, Tokyo (JP)

(73) Assignee: Sony Corporation, Tokyo (JP)

( * ) Notice: Subject to any disclaimer, the term of this patent is extended or adjusted under 35 U.S.C. 154(b) by 745 days.

(21) Appl. No.: 13/216,973

(22) Filed: Aug. 24, 2011

(65) Prior Publication Data

US 2012/0050279 A1    Mar. 1, 2012

(30) Foreign Application Priority Data

Aug. 31, 2010    (JP) ................ P2010-194108

(51) Int. Cl.
*G06T 15/00*    (2011.01)
*H04N 13/00*    (2006.01)
*H04N 13/04*    (2006.01)

(52) U.S. Cl.
CPC ....... *H04N 13/0029* (2013.01); *H04N 13/0497* (2013.01)

(58) Field of Classification Search
None
See application file for complete search history.

(56) References Cited

U.S. PATENT DOCUMENTS

| | | | | |
|---|---|---|---|---|
| 5,917,539 | A * | 6/1999 | Sorensen et al. | 348/56 |
| 7,394,485 | B2 * | 7/2008 | Kim | 348/220.1 |
| 7,528,879 | B2 * | 5/2009 | Kuroki | 348/333.03 |
| 7,705,935 | B2 * | 4/2010 | Gaudreau | 349/96 |
| 8,031,382 | B2 * | 10/2011 | Johnson | 359/9 |
| 8,139,045 | B2 * | 3/2012 | Jang et al. | 345/175 |
| 8,174,581 | B2 * | 5/2012 | Nakamura | 348/169 |
| 8,416,353 | B2 * | 4/2013 | Lin | 349/15 |
| 8,482,654 | B2 * | 7/2013 | Lipton et al. | 348/340 |
| 2002/0050986 | A1 * | 5/2002 | Inoue et al. | 345/204 |
| 2003/0098866 | A1 * | 5/2003 | Lee | 345/539 |
| 2004/0036763 | A1 * | 2/2004 | Swift et al. | 348/51 |
| 2004/0049124 | A1 * | 3/2004 | Kullok et al. | 600/558 |
| 2004/0070667 | A1 * | 4/2004 | Ando | 348/46 |
| 2004/0151352 | A1 * | 8/2004 | Nakajima et al. | 382/124 |
| 2004/0246363 | A1 * | 12/2004 | Kim | 348/335 |
| 2006/0012676 | A1 * | 1/2006 | Tomita | 348/51 |
| 2007/0008314 | A1 * | 1/2007 | Song et al. | 345/419 |
| 2008/0031515 | A1 * | 2/2008 | Bae et al. | 382/154 |
| 2008/0246897 | A1 * | 10/2008 | Gaudreau | 349/15 |
| 2009/0293003 | A1 * | 11/2009 | Nykamp | 715/755 |
| 2010/0045782 | A1 * | 2/2010 | Morita | 348/51 |
| 2010/0103249 | A1 * | 4/2010 | Lipton et al. | 348/51 |
| 2010/0182402 | A1 * | 7/2010 | Nakajima et al. | 348/42 |
| 2010/0272417 | A1 * | 10/2010 | Nagasawa et al. | 386/97 |
| 2011/0181708 | A1 * | 7/2011 | Yoon et al. | 348/56 |
| 2011/0249101 | A1 * | 10/2011 | Lee et al. | 348/50 |
| 2012/0069015 | A1 * | 3/2012 | Han et al. | 345/419 |

FOREIGN PATENT DOCUMENTS

JP    2010-45584    2/2010

* cited by examiner

*Primary Examiner* — Dave Czekaj
*Assistant Examiner* — Kehinde O Abimbola
(74) *Attorney, Agent, or Firm* — Paratus Law Group, PLLC

(57) ABSTRACT

There is provided an information processing apparatus including a display control unit causing an image for a left eye and an image for a right eye to be displayed respectively to a left eye and a right eye of an observer, the image for a left eye and the image for a right eye showing a stereoscopic image, and interchanging, depending on an amount of change occurring at a time of change of display of the stereoscopic image, images to be displayed respectively to the left eye and the right eye of the observer.

15 Claims, 13 Drawing Sheets

INFORMATION PROCESSING APPARATUS, PROGRAM, AND INFORMATION PROCESSING METHOD

BACKGROUND

The present disclosure relates to an information processing apparatus, a program, and an information processing method.

In recent years, it is becoming common to provide a stereoscopic image to a user by using a display device such as a display of a TV or a personal computer (PC). A stereoscopic image is realized as described in JP 2010-045584A by giving a predetermined parallax between an image for a left eye presented to the right eye of an observer and an image for a right eye presented to the left eye of the observer. For example, in the case of a TV, in many cases, images for multiple viewpoints including a plurality of combinations of an image for a left eye and an image for a right eye are displayed to cope with the movement of the viewpoint of a user by using separation of viewpoint images using a parallax barrier or the like.

On the other hand, images such as a photograph (a still image) and a video are commonly displayed on a screen while being changed in display, for example, while being rotated. For example, with software, such as slideshow software, for sequentially displaying a series of images saved in a PC, rotation of an image is frequently used as a visual effect at the time of display of the image. Also, with software for browsing satellite images or the like, for example, images can be freely rotated in many cases by an operation by a user.

SUMMARY

However, with a stereoscopic image as described in the patent document mentioned above where parallax is given to an image for a left eye and an image for a right eye, there is an issue that pseudoscopy occurs when the left and right of an image is reversed due to the change in display such as rotation. Pseudoscopy means a state where the direction of parallax is reversed for an image for a left eye and an image for a right eye. In the state of pseudoscopy, the foreground and the background of a stereoscopic image are perceived in a reversed manner, for example, thereby giving a user an unpleasant feeling.

In light of the foregoing, it is desirable to provide an information processing apparatus, a program and an information processing method which are novel and improved, and which are capable of reducing the influence to parallax caused due to a change in display of a stereoscopic image.

According to an embodiment of the present disclosure, there is provided an information processing apparatus which includes a display control unit causing an image for a left eye and an image for a right eye to be displayed respectively to a left eye and a right eye of an observer, the image for a left eye and the image for a right eye showing a stereoscopic image, and interchanging, depending on an amount of change occurring at a time of change of display of the stereoscopic image, images to be displayed respectively to the left eye and the right eye of the observer.

When the amount of change indicates that a relative shift between the image for a left eye and the image for a right eye is reversed in a horizontal direction, the display control unit may interchange the images to be displayed respectively to the left eye and the right eye of the observer.

When a rotation angle of the stereoscopic image is within a first range including $(180 \times n)°$ (n is an odd number), the display control unit may interchange the images to be displayed respectively to the left eye and the right eye of the observer.

The first range may be $((180 \times n) \pm 45)°$.

The display control unit may cause an interpolation image to be displayed at a time of interchanging the images to be displayed respectively to the left eye and the right eye of the observer.

The display control unit may cause a same image to be displayed to each of the left eye and the right eye of the observer, depending on the amount of change.

When the amount of change indicates that a relative shift between the image for a left eye and the image for a right eye is larger in a vertical direction than in a horizontal direction, the display control unit may cause the same image to be displayed to each of the left eye and the right eye of the observer.

The same image may be the image for a left eye or the image for a right eye.

When a rotation angle of the stereoscopic image is within a second range including $(90 \times m)°$ (m is an odd number), the display control unit may cause the same image to be displayed to each of the left eye and the right eye of the observer.

The second range may be $((90 \times m) \pm 45)°$.

The display control unit may display an interpolation image at a time of causing the same image to be displayed to each of the left eye and the right eye of the observer.

The interpolation image may be generated by linear interpolation between the image for a left eye and the image for a right eye.

The interpolation image may be displayed for 250 ms.

According to another embodiment of the present disclosure, there is provided a program for causing a computer to realize a process of causing an image for a left eye and an image for a right eye to be displayed respectively to a left eye and a right eye of an observer, the image for a left eye and the image for a right eye showing a stereoscopic image, and a process of interchanging, depending on an amount of change occurring at a time of change of display of the stereoscopic image, images to be displayed respectively to the left eye and the right eye of the observer.

According to another embodiment of the present disclosure, there is provided an information processing method which includes causing an image for a left eye and an image for a right eye to be displayed respectively to a left eye and a right eye of an observer, the image for a left eye and the image for a right eye showing a stereoscopic image, and interchanging, depending on an amount of change occurring at a time of change of display of the stereoscopic image, images to be displayed respectively to the left eye and the right eye of the observer.

According to the embodiments of the present disclosure described above, it is possible to reduce the influence to parallax caused due to a change in display of a stereoscopic image.

DETAILED DESCRIPTION OF THE EMBODIMENT(S)

Figure 1:
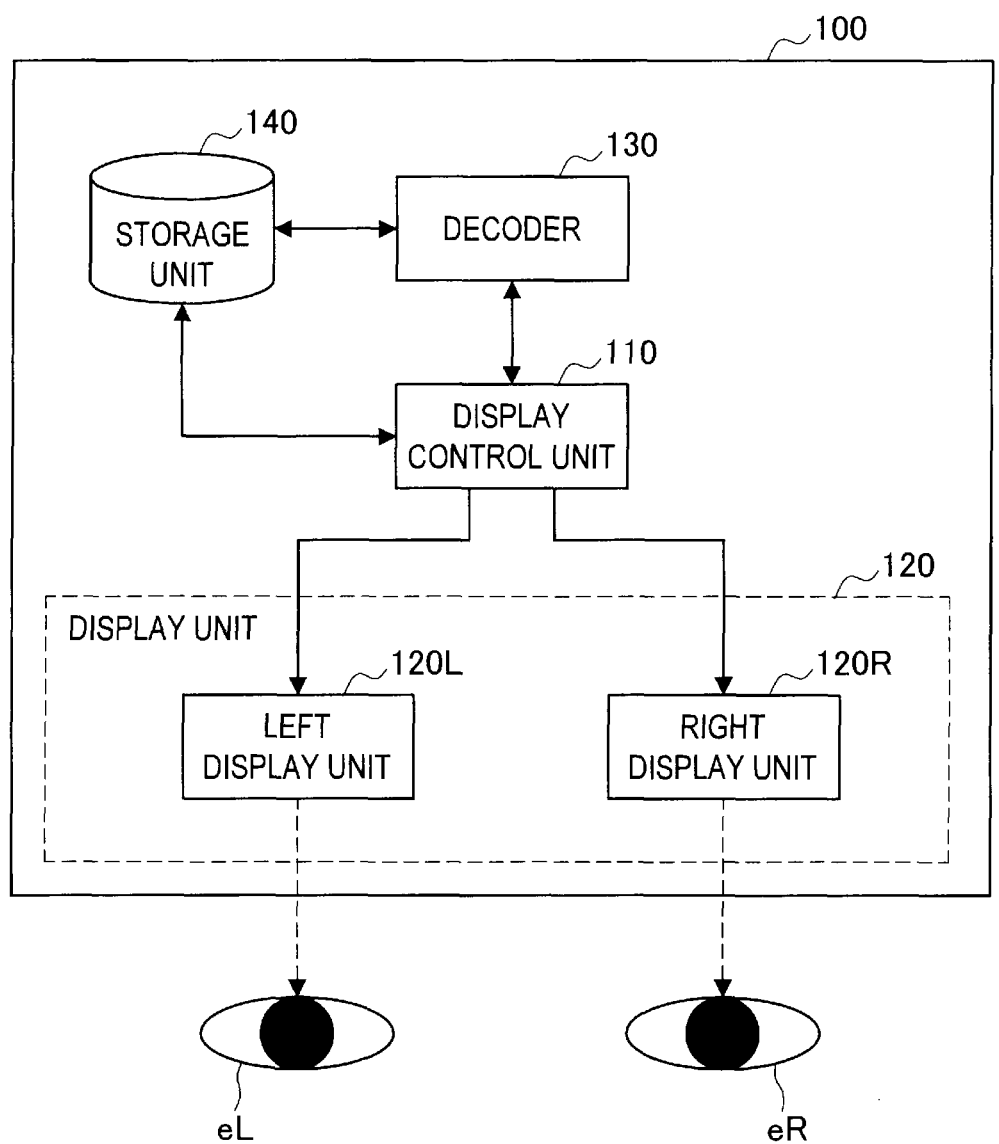
FIG. 1 is a block diagram showing a functional configuration of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.
1. First Embodiment
　1-1. Configuration of Information Processing Apparatus
　1-2. Process for Case where Display of Stereoscopic Image is Changed
2. Second Embodiment
3. Third Embodiment
　3-1. Process for Case where Display of Stereoscopic Image is Changed
　3-2. Modified Example
4. Fourth Embodiment
5. Summary

1. First Embodiment

1-1. Configuration of Information Processing Apparatus

First, a configuration of an information processing apparatus according to a first embodiment of the present disclosure will be described with reference to FIG. 1. FIG. 1 is a block diagram showing a functional configuration of an information processing apparatus according to the present embodiment.

Referring to FIG. 1, an information processing apparatus 100 includes a display control unit 110, a display unit 120, a decoder 130, and a storage unit 140. The display unit 120 includes a left display unit 120L and a right display unit 120R. An image displayed on the left display unit 120L is presented to a left eye eL of an observer. Also, an image displayed on the right display unit 120R is presented to a right eye eR of the observer. Additionally, the display unit 120 may include a display unit other than the left display unit 120L and the right display unit 120R, and the display control unit 110 may output a plurality of viewpoint images including a viewpoint image corresponding to the display unit other than the left display unit 120L and the right display unit 120R.

The display control unit 110 outputs to the left display unit 120L and the right display unit 120R an image for a left eye and an image for a right eye having parallax therebetween, and causes a stereoscopic image to be displayed. At this point, the display control unit 110 may add to the stereoscopic image that is displayed a change in display such as enlargement, reduction, rotation or the like. Also, as will be described later, the display control unit 110 may control, depending on the amount of change occurring when display of the stereoscopic image is changing, images to be output to the left display unit 120L and the right display unit 120R. The display control unit 110 is realized by a processor such as a DSP (Digital Signal Processor), for example. In this case, the processor realizes the function of the display control unit 110 by operating according to a program stored in the storage unit 140. The processor may also operate using a DRAM (Dynamic Random Access Memory) included in the storage unit 140, for example. The program mentioned above may be provided to the information processing apparatus 100 by being stored in a removable recording medium such as a memory card or a disc storage medium, for example, or may be downloaded on the information processing apparatus 100 via a network such as a LAN (Local Area Network) or the Internet.

The display unit 120 may be a display such as an LCD (Liquid Crystal Display), a PDP (Plasma Display Panel) or an organic EL (Electro-Luminescence) panel, for example. The display unit 120 includes the left display unit 120L and the right display unit 120R, and the left display unit 120L and the right display unit 120R each display an image input from the display control unit 110. A method of leading the image for a left eye to the left eye eL of the observer from the left display unit 120L and leading the image for a right eye to the right eye eR of the observer from the right display unit 120R can be selected as appropriate. For example, a parallax barrier method or a lenticular lens method may be used as this method. In this case, the left display unit 120L and the right display unit 120R may be collections of pixels on the display unit 120 assigned respectively to the image for a left eye and the image for a right eye. Also, a frame sequential method may also be used as the method described above. In this case, the image for a left eye and the image for a right eye are alternately displayed on the display unit 120 in predetermined time units. That is, in this case, the display unit 120 functions, on a time basis, as the left display unit 120L at the time of displaying the image for a left eye and as the right display unit 120R at the time of displaying the image for a right eye.

The decoder 130 obtains the image for a left eye and the image for a right eye of the stereoscopic image by reading image data stored in the storage unit 140 and decoding the read image data according to a predetermined format. The decoder 130 outputs the acquired image for a left eye and the acquired image for a right eye to the display control unit 110. The decoder 130 may be realized, as with the display control unit 110, by a processor such as a DSP operating according to a program, for example, or may be realized by dedicated hardware using an integrated circuit.

Data related to processing of the information processing apparatus 100 is stored in the storage unit 140. For example, the storage unit 140 may be a semiconductor memory such as a flash ROM or a DRAM, an optical disc such as a BD (Blu-ray Disc), a DVD (Digital Versatile Disc) or a CD (Compact Disc), or a hard disk. The storage unit 140 may be a storage device embedded in the information processing apparatus 100, or may be a removable medium such as a memory card that can be attached/removed to/from the information processing apparatus 100. Also, the storage unit 140 may include a plurality of types of storage devices or removable media. Besides the image data to be read by the decoder 130, a program used by a processor such as a DSP to operate to realize the function of the display control unit 110 and the like may also be stored in the storage unit 140.

1-2. Process for Case where Display of Stereoscopic Image is Change

Figure 2:
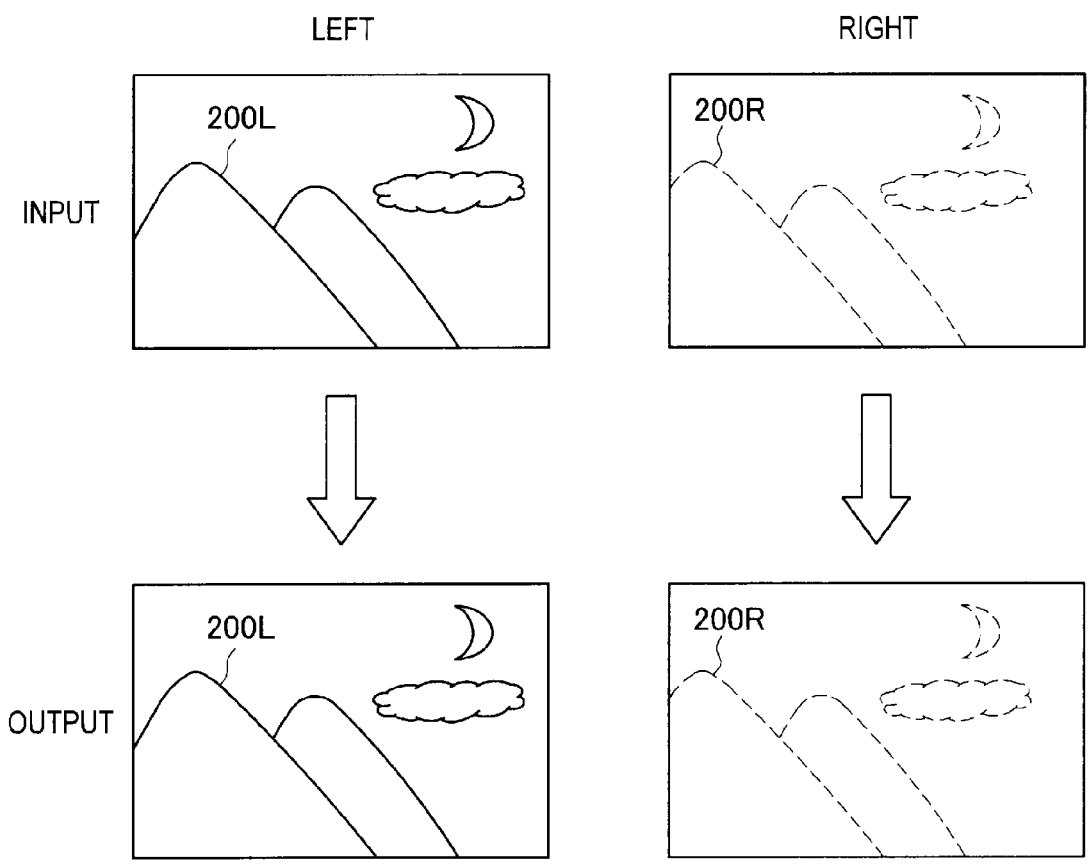
FIG. 2 is an explanatory diagram regarding input and output of a stereoscopic image according to the embodiment.
Figure 3:
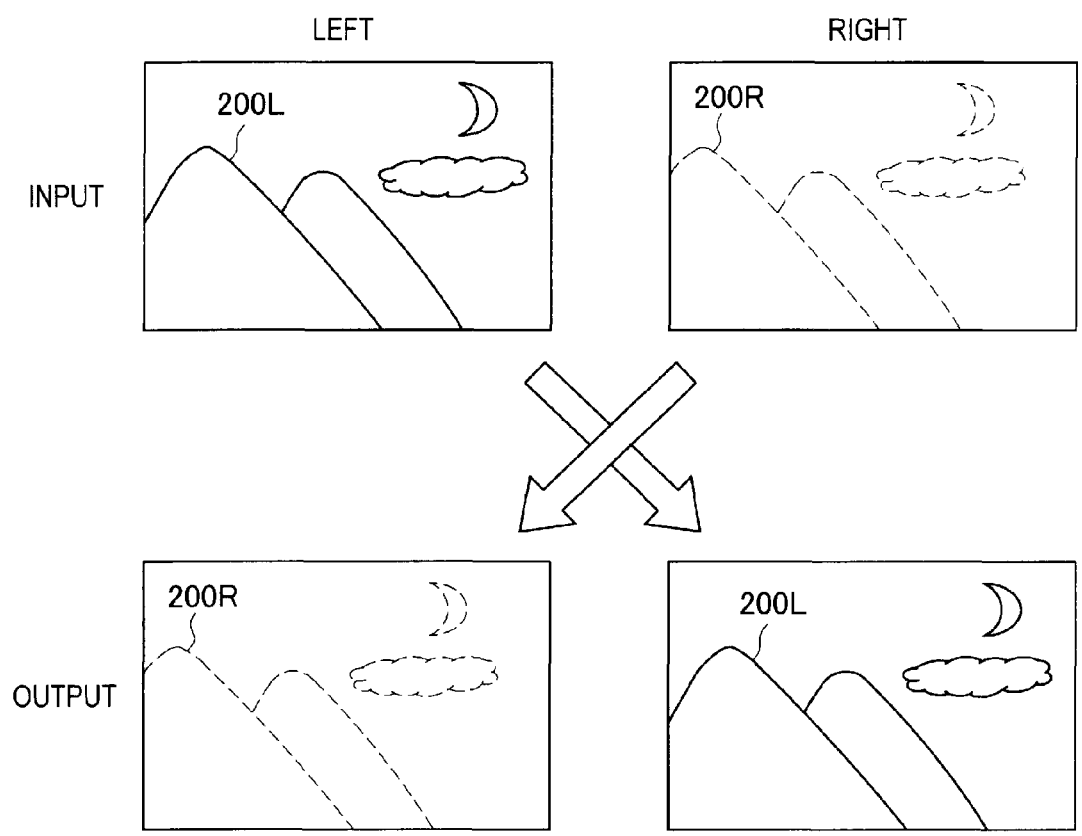
FIG. 3 is an explanatory diagram regarding input and output of a stereoscopic image according to the embodiment.
Figure 4:
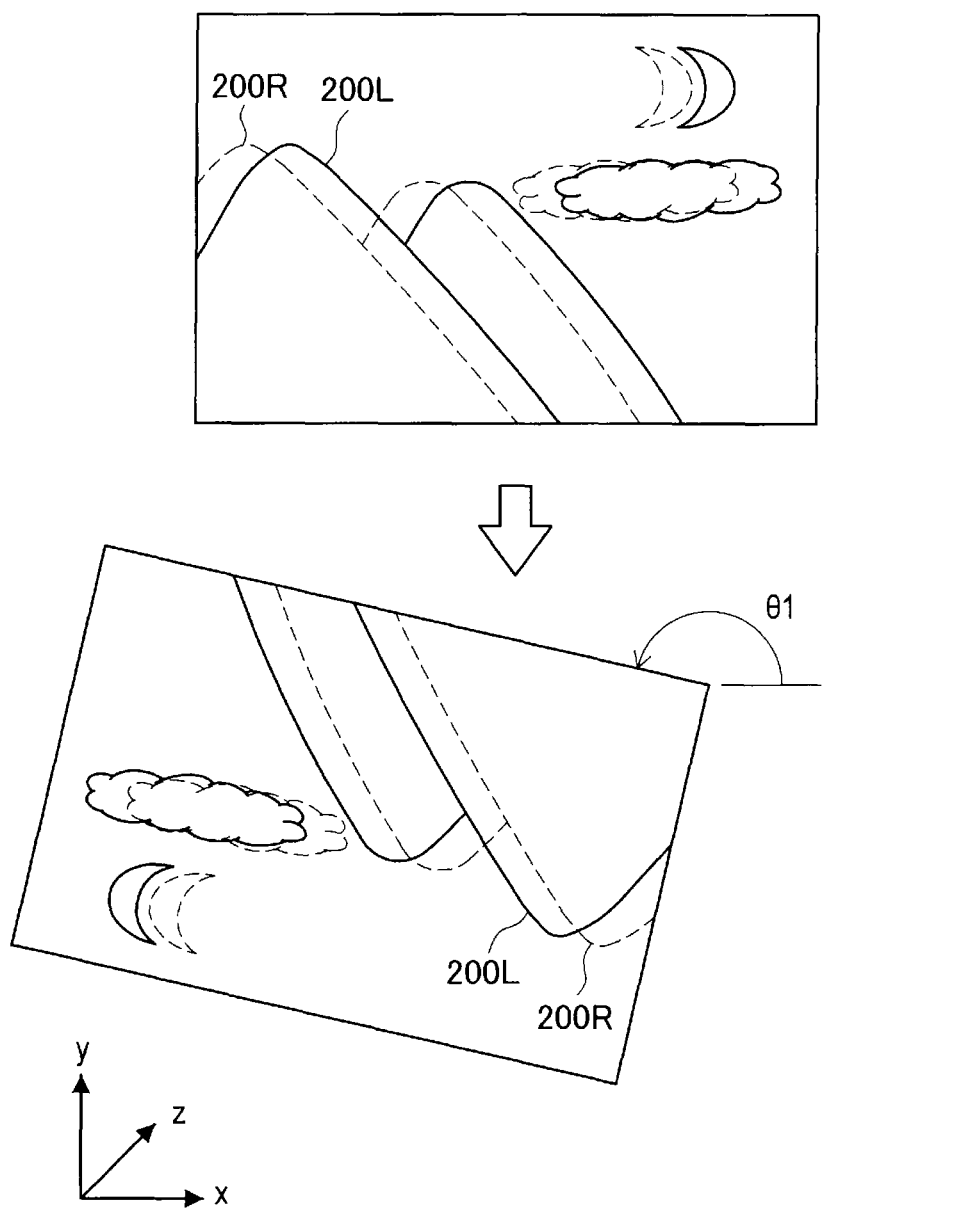
FIG. 4 is an explanatory diagram regarding a change in display of a stereoscopic image according to the embodiment.
Figure 5:
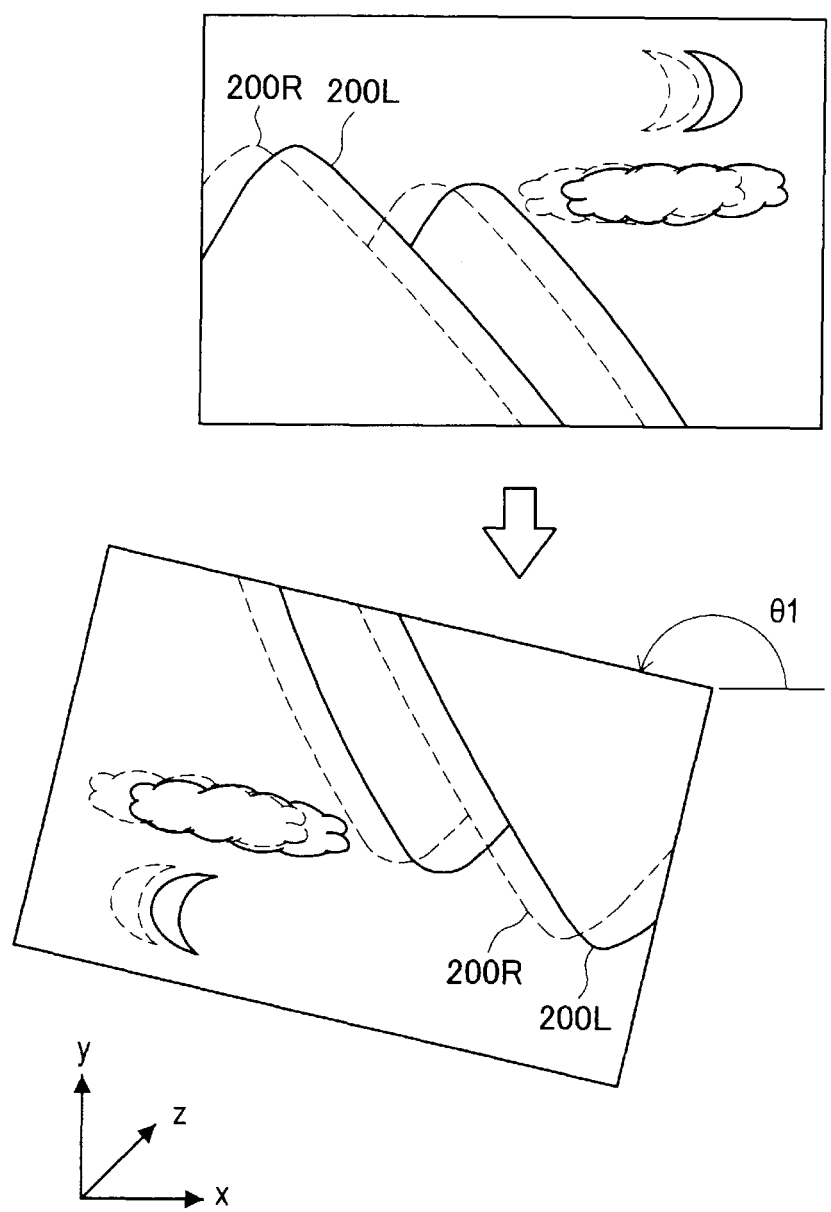
FIG. 5 is an explanatory diagram regarding a change in display of a stereoscopic image according to the embodiment.
Figure 6:
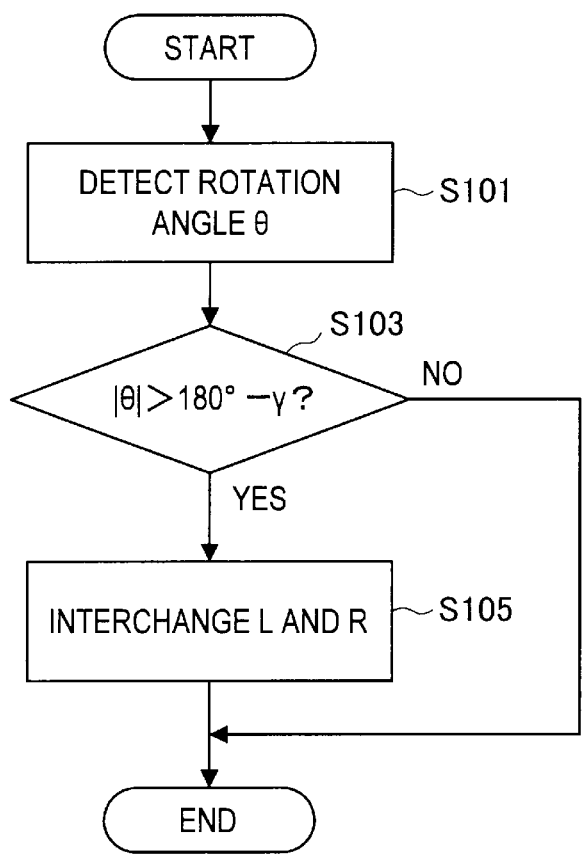
FIG. 6 is a flow chart showing a process of the information processing apparatus according to the embodiment.

Next, a process of the information processing apparatus 100 according to the first embodiment of the present disclosure for a case where the display of a stereoscopic image is changed will be described with reference to FIGS. 2 to 6. FIGS. 2 and 3 are diagrams schematically showing relationships between images input from the decoder 130 to the display control unit 110 and images output from the display control unit 110 to the left display unit 120L and the right display unit 120R according to the present embodiment. FIGS. 4 and 5 are diagrams schematically showing changes in display of a stereoscopic image displayed by the display control unit 110 according to the present embodiment. FIG. 6 is flow chart showing a process of the display control unit 110 according to the present embodiment.

FIG. 2 schematically displays images input from the decoder 130 of the information processing apparatus 100 to the display control unit 110 and images output from the display control unit 110 to the left display unit 120L and the right display unit 120R in a normal state. An image for a left eye 200L and an image for a right eye 200R are input from the decoder 130 to the display control unit 110. The display control unit 110 outputs the image for a left eye 200L to the left display unit 120L and the image for a right eye 200R to the right display unit 120R.

On the other hand, FIG. 3 schematically shows images input from the decoder 130 to the display control unit 110 and images output from the display control unit 110 to the left display unit 120L and the right display unit 120R in a case the display control unit 110 changes the display of a stereoscopic image and the amount of this change satisfies a predetermined condition. As with the case shown in FIG. 2, an image for a left eye 200L and an image for a right eye 200R are input from the decoder 130 to the display control unit 110. The display control unit 110 inputs the image for a left eye 200L to the right display unit 120R and the image for a right eye 200R to the left display unit 120L. That is, in this case, the display control unit 110 interchanges the images to be displayed respectively to the left eye eL and the right eye eR of the observer.

FIG. 4 shows states before and after the display control unit 110 rotates a stereoscopic image by a rotation angle of θ1. Additionally, in the following explanation, it is assumed that the stereoscopic image is displayed on a three-directional coordinate system that takes the horizontal direction of the screen as the x-axis, the vertical direction of the screen as the y-axis, and the depth direction of the screen as the z-axis. In the illustrated example, the display control unit 110 adds to the stereoscopic image rotation of the rotation angle θ1 around the z-axis. As shown here in the drawing, the rotation angle θ1 is assumed to be an angle that is nearly 180 degrees. It is also assumed that, at the time of rotation of the stereoscopic image, the image for a left eye 200L and the image for a right eye 200R are rotated integrally with each other while maintaining their relative positions.

Here, the image for a left eye 200L and the image for a right eye 200R are displayed being shifted relative to each other. This relative shift is a schematically shown parallax. Additionally, a parallax according to which the image for a left eye 200L shifts to the left on the screen relative to the image for a right eye 200R will be taken as a parallax with a positive value. In the illustrated example, the same parallax is set for the entire stereoscopic image, for the sake of simplicity of explanation. However, the values of the parallax in an actual stereoscopic image are not necessarily the same. The positive and negative of the parallax can be independently set for each part of an image, such as, the value of the parallax is positive for one part of an image and the value of the parallax is negative for another part of the image. The size of the value of the parallax can also be different for each part of an image. However, also in such a case, it remains that the parallax is set as the relative shift in the horizontal direction of a screen. Accordingly, the following explanation that uses the illustrated example can be universally applied in relation to a stereoscopic image. Additionally, in a stereoscopic image, a part where the value of the parallax is positive looks as if it receded toward the back of the screen. On the other hand, a part where the value of the parallax is negative looks as if it is popped out into the foreground of the screen.

In the illustrated example, the image for a left eye 200L of the stereoscopic image before rotation is displayed being shifted to the right on the screen relative to the image for a right eye 200R. On the other hand, the image for a left eye 200L of the stereoscopic image after rotation is displayed being shifted to the left on the screen relative to the image for a right eye 200R. That is, while the stereoscopic image before rotation has a parallax of a negative value, the stereoscopic image after rotation has a parallax of a positive value. This means that the positive/negative of the value of the parallax of the stereoscopic image is reversed by rotation by the rotation angle θ1. When the positive/negative of the value of the parallax is reversed, the direction of the parallax will be reversed in the horizontal direction. This state is the state of pseudoscopy. In the state of pseudoscopy, the positive/negative of the value of the parallax related to the perception of foreground and background of a screen becomes reversed as described above, and thus the way a stereoscopic image is seen becomes extremely unnatural, creating a large burden for observers. Accordingly, in such a case, the display control unit 110 of the information processing apparatus 100 performs a process, as shown in FIG. 3, of interchanging the images to be displayed respectively to the left eye eL and the right eye eR of an observer.

FIG. 5 shows the states of a stereoscopic image before and after rotation in a case where the display control unit 110 rotates the stereoscopic image by the rotation angle θ1 and also interchanges the images to be displayed respectively to the left eye eL and the right eye eR of an observer. In the illustrated example, the image for a left eye 200L of the stereoscopic image before rotation is displayed being shifted to the right on the screen relative to the image for a right eye 200R. On the other hand, also in the stereoscopic image after rotation, the image for a left eye 200L is displayed being shifted to the right on the screen relative to the image for a right eye 200R. That is, while the stereoscopic image before rotation has a parallax of a negative value, the stereoscopic image after rotation also has a parallax of a negative value. This means that rotation by the rotation angle θ1 reversed the positive/negative of the value of the parallax of the stereoscopic image, but since the display control unit 110 interchanged the image for a left eye 200L and the image for a right eye 200R, reversal was offset and the positive/negative of the value of the parallax of the stereoscopic image did not change. Accordingly, in the illustrated case, a state of pseudoscopy is not caused.

FIG. 6 shows, by a flow chart, a process of the display control unit 110 of the information processing apparatus 100 for realizing display of stereoscopic images described using FIGS. 2 to 5. First, the display control unit 110 detects a rotation angle θ (step S101). Next, the display control unit 110 determines whether the rotation angle θ is within a first range expressed by |θ|>180°−γ or not (step S103). The γ indicates the scope of the first range. Additionally, values that the γ may take will be described later. In the case it is determined here that the rotation angle θ is within the first range, the display control unit 110 interchanges the images to be displayed respectively to the left eye eL and the right eye eR (step S105). On the other hand, in the case it is determined in step S103 that the rotation angle θ is not within the first range, the display control unit 110 ends the process.

In the above flow chart, the rotation angle θ can be acquired from a model view transformation matrix at the time of change of display of a stereoscopic image by the display control unit 110, for example. Specifically, the θ can be calculated, by using the inverse trigonometric function arctan, from an x coordinate and a y coordinate of a vector v that is obtained by multiplying a 3×3 matrix R indicating a model view transformation matrix by a unit vector along the x-axis. The rotation angle θ can also be obtained by other methods.

Furthermore, in the above flow chart, the rotation angle θ at the time of the display control unit 110 interchanging the images to be displayed respectively to the left eye eL and the right eye eR indicates that the relative shift between the image for a left eye 200L and the image for a right eye 200R is reversed on the horizontal direction. Accordingly, the value of the γ may be any value below 90°. This is because reversal of the positive/negative of the value of the parallax does not occur unless |θ|>180°−90°, that is, |θ|>90°.

2. Second Embodiment

Figure 7:
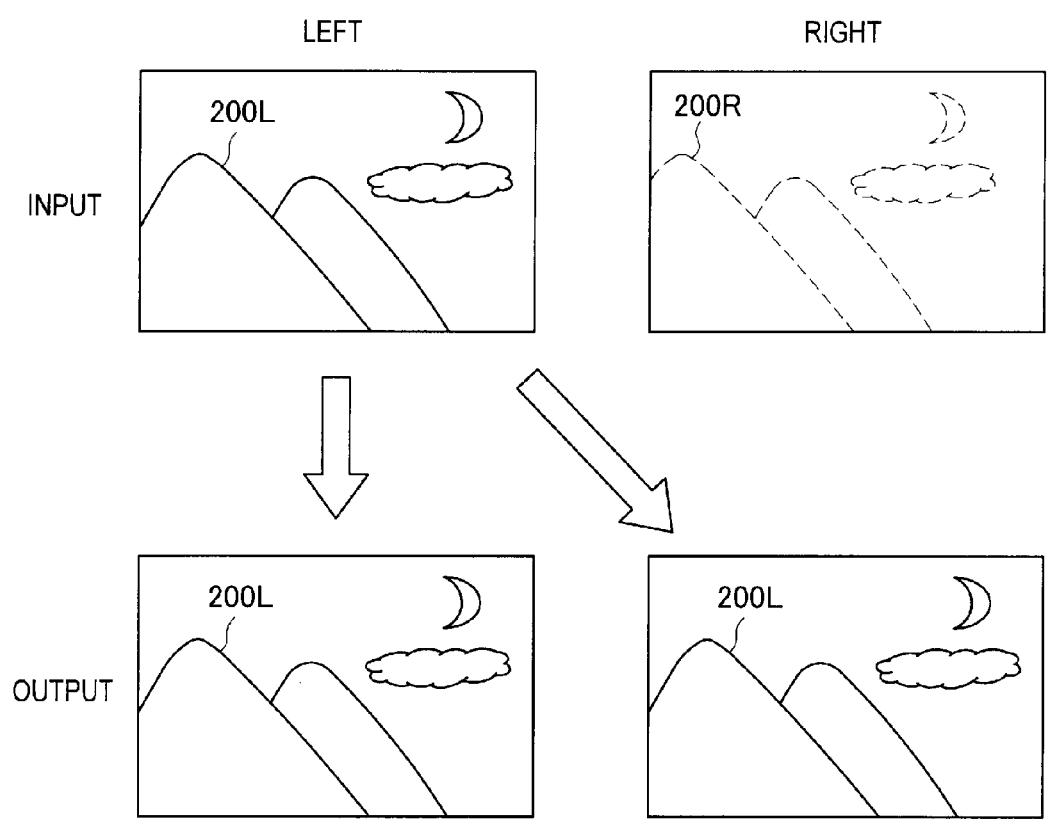
FIG. 7 is an explanatory diagram regarding input and output of a stereoscopic image according to a second embodiment of the present disclosure.
Figure 8:
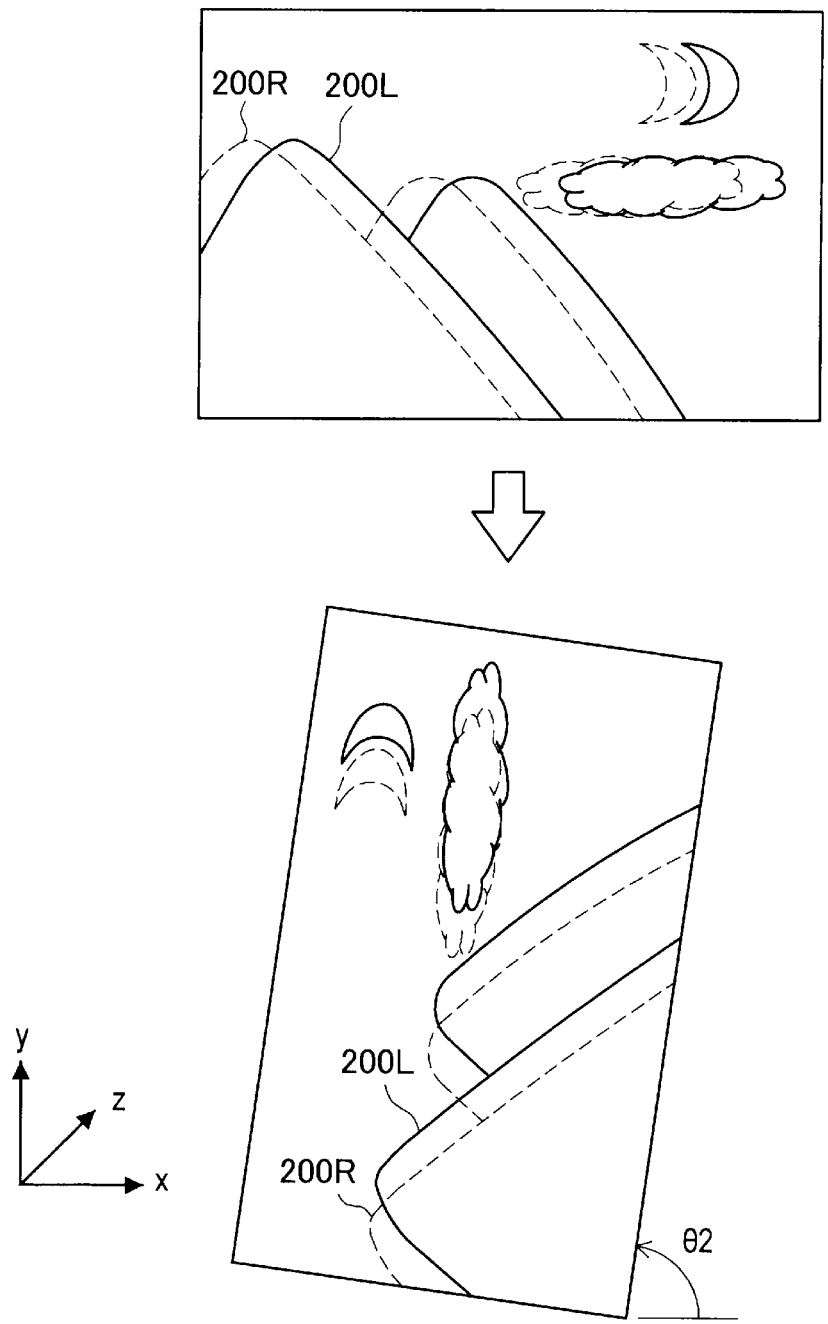
FIG. 8 is an explanatory diagram regarding a change in display of a stereoscopic image according to the embodiment.
Figure 9:
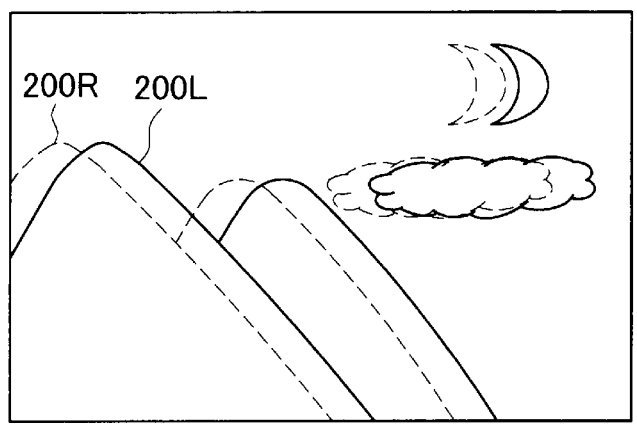
FIG. 9 is an explanatory diagram regarding a change in display of a stereoscopic image according to the embodiment.
Figure 9:
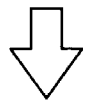
Figure 9:
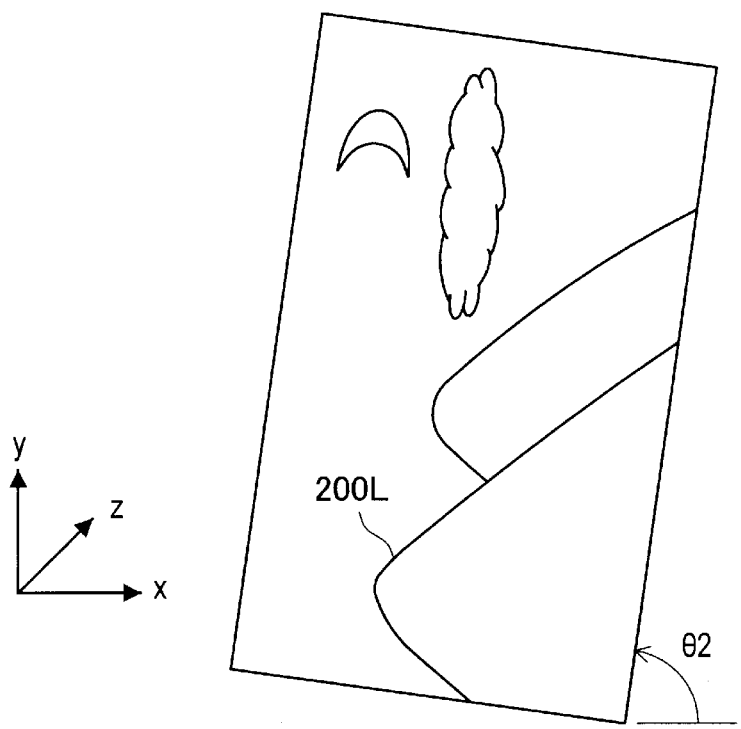
Figure 10:
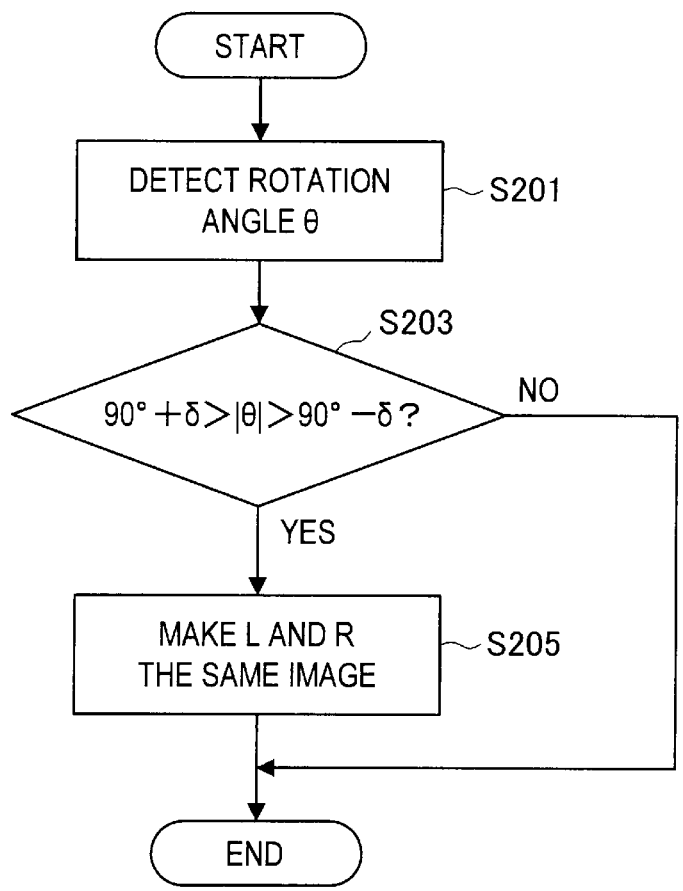
FIG. 10 is a flow chart showing a process of an information processing apparatus according to the embodiment.

Next, a second embodiment of the present disclosure will be described with reference to FIGS. 7 to 10. Additionally, the second embodiment of the present disclosure differs from the first embodiment in the process of the display control unit 110 for controlling an image to be output depending on the amount of change occurring at the time of change of display of a stereoscopic image, but other functional configurations are substantially the same as those of the first embodiment, and the detailed description thereof will be omitted. FIG. 7 is a diagram schematically showing a relationship between images input from the decoder 130 to the display control unit 110 and images output from the display control unit 110 to the left display unit 120L and the right display unit 120R according to the present embodiment. FIGS. 8 and 9 are diagrams schematically showing changes in display of a stereoscopic image displayed by the display control unit 110 according to the present embodiment. FIG. 10 is flow chart showing a process of the display control unit 110 according to the present embodiment.

FIG. 7 schematically shows images input from the decoder 130 to the display control unit 110 and images output from the display control unit 110 to the left display unit 120L and the right display unit 120R in a case the display control unit 110 changes the display of a stereoscopic image and the amount of this change satisfies a predetermined condition. As with the case shown in FIG. 2, an image for a left eye 200L and an image for a right eye 200R are input from the decoder 130 to the display control unit 110. The display control unit 110 outputs the image for a left eye 200L to both the left display unit 120L and the right display unit 120R. That is, in this case, the display control unit 110 displays the same image to each of the left eye eL and the right eye eR of an observer. Additionally, the one image that is presented to the left eye eL and the right eye eR of the observer does not necessarily have to be the image for a left eye 200L. The one image that is presented to the left eye eL and the right eye eR of the observer may be the image for a right eye 200R, or may be an image that is separately generated.

FIG. 8 shows the states before and after the display control unit 110 rotates a stereoscopic image by a rotation angle of θ2. In the illustrated example, the display control unit 110 adds to the stereoscopic image rotation of the rotation angle θ2 around the z-axis. As shown here in the drawing, the rotation angle θ2 is assumed to be an angle that is nearly 90 degrees. It is also assumed that, at the time of rotation of the stereoscopic image, the image for a left eye 200L and the image for a right eye 200R are rotated integrally with each other while maintaining their relative positions.

In the illustrated example, the image for a left eye 200L of the stereoscopic image before rotation is displayed being shifted to the right on the screen relative to the image for a right eye 200R. On the other hand, the image for a left eye 200L of the stereoscopic image after rotation is displayed being shifted to the upper part of the screen relative to the image for a right eye 200R. That is, in the stereoscopic image after rotation, the relative shift between the image for a left eye 200L and the image for a right eye 200R is larger in the vertical direction of the screen than in the horizontal direction. In such a case, although a state of pseudoscopy is not caused, a shift in a direction different from that of a parallax intrinsically set in a stereoscopic image is caused, thereby allowing for the possibility that an unnatural impression is given to an observer. Accordingly, in such a case, the display control unit 110 of the information processing apparatus 100 performs a process, as shown in FIG. 7, of displaying the same image to each of the left eye eL and the right eye eR of an observer.

FIG. 9 shows the states of a stereoscopic image before and after rotation in a case the display control unit 110 rotates the stereoscopic image by the rotation angle θ2 and also causes the same image to be displayed to each of the left eye eL and the right eye eR of an observer. In the illustrated example, the image for a left eye 200L of the stereoscopic image before rotation is displayed being shifted to the right on the screen relative to the image for a right eye 200R. On the other hand, according to the stereoscopic image after rotation, the image for a left eye 200L is displayed to both the left eye eL and the right eye eR of the observer. This means that, since a shift in a direction different from that of a parallax intrinsically set in a stereoscopic image is caused by rotation by the rotation angle θ2, the same image is displayed to each of the left eye eL and the right eye eR to cancel this shift. Accordingly, it is unlikely in the illustrated case that an unnatural impression is given to the observer.

FIG. 10 shows, by a flow chart, a process of the display control unit 110 of the information processing apparatus 100 for realizing display of stereoscopic images described using FIGS. 7 to 9. First, the display control unit 110 detects a rotation angle θ (step S201). Next, the display control unit 110 determines whether the rotation angle θ is within a second range expressed by 90°+δ>|θ|>90°−δ or not (step S203). The δ indicates the scope of the second range. Additionally, values that the δ may take will be described later. In the case it is determined here that the rotation angle θ is within the second range, the display control unit 110 causes the same image to be displayed to each of the left eye eL and the right eye eR (step S205). On the other hand, in the case it is determined in step S203 that the rotation angle θ is not within the second range, the display control unit 110 ends the process.

In the above flow chart, the rotation angle θ at the time of the display control unit 110 causing the same image to be displayed to each of the left eye eL and the right eye eR indicates that the relative shift between the image for a left eye 200L and the image for a right eye 200R is larger in the vertical direction than in the horizontal direction and that it is highly likely that an unnatural impression is given to the observer. Accordingly, the value of the δ may be any value below 45°. This is because, when within the range of 90°−45°>|↓|, that is, 45°>|θ|, correction is effected by visual perception, and a stereoscopic image that is not unnatural is perceived.

3. Third Embodiment

Figure 11:
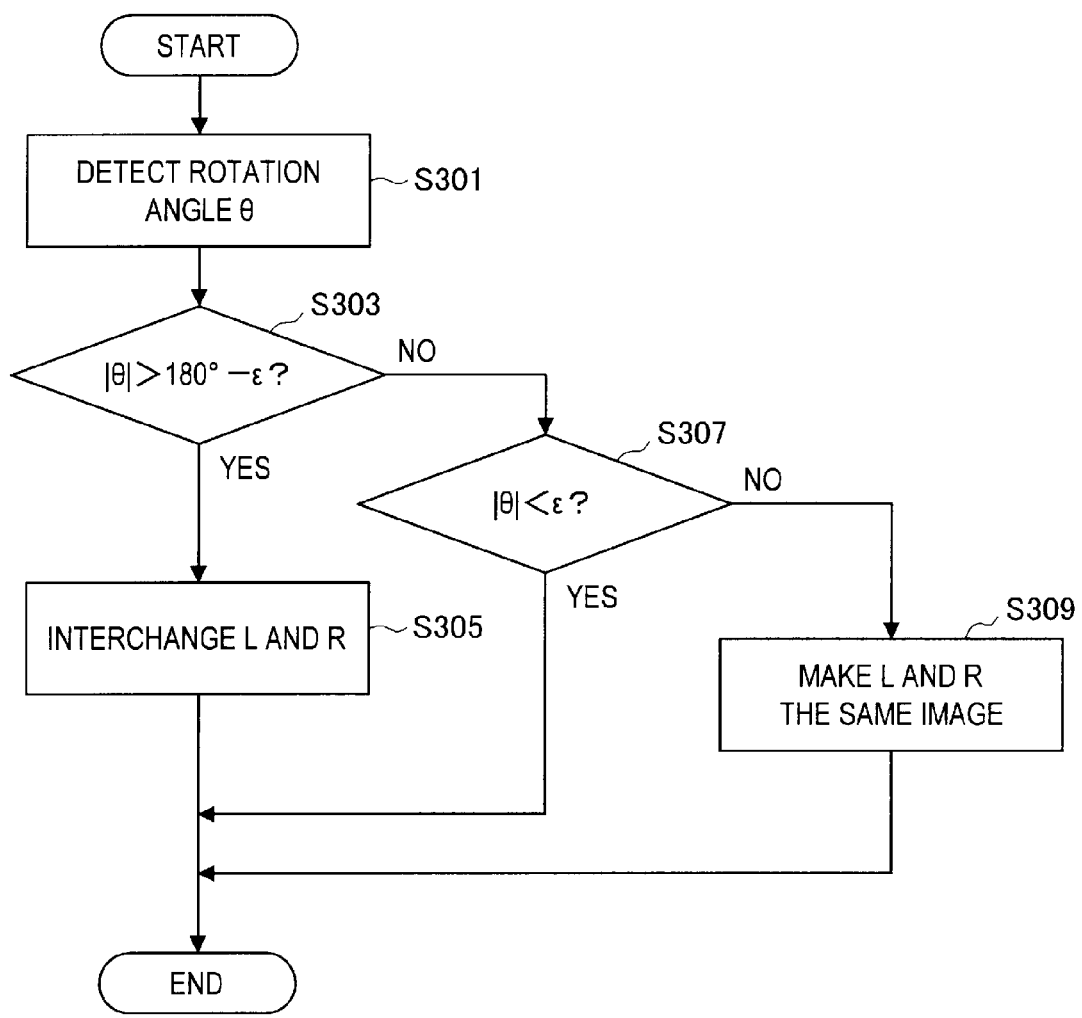
FIG. 11 is a flow chart showing a process of an information processing apparatus according to a third embodiment of a present disclosure.
Figure 12:
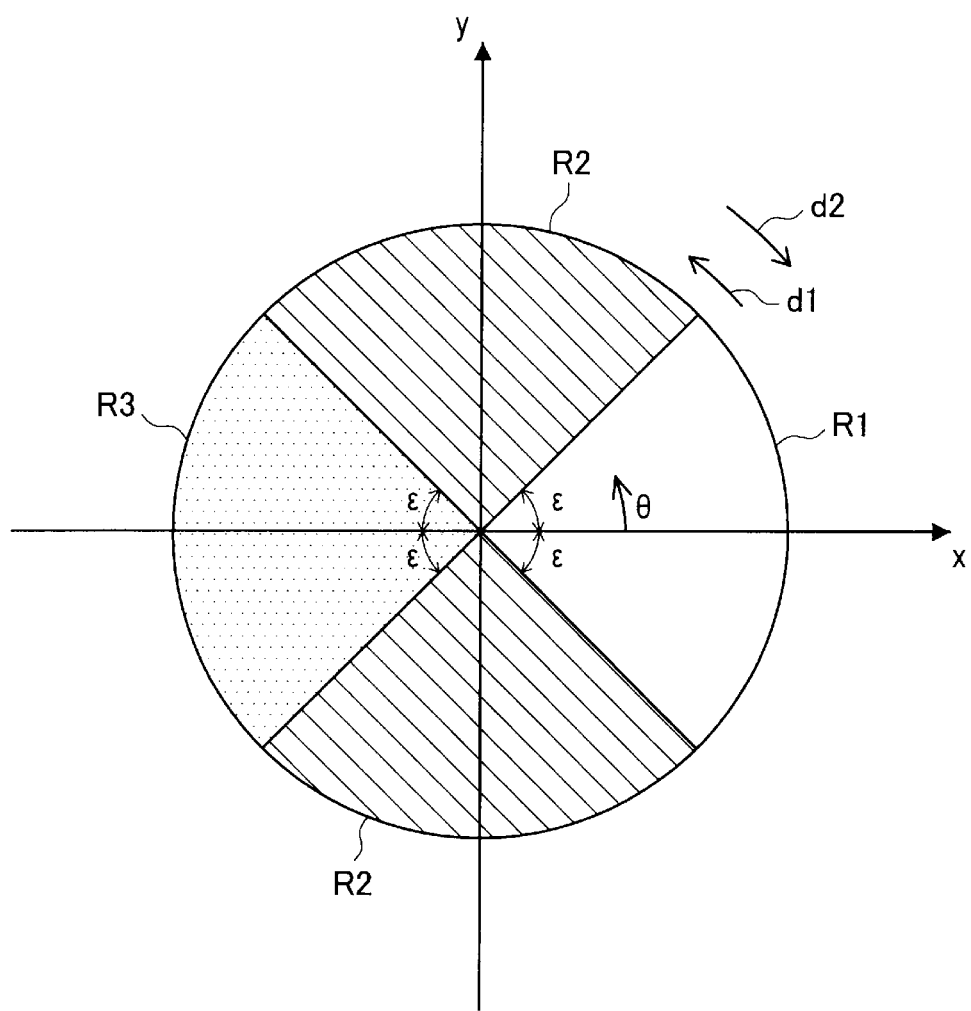
FIG. 12 is an explanatory diagram regarding determination of a rotation angle according to the embodiment.

Next, a third embodiment of the present disclosure will be described with reference to FIGS. 11 and 12. Additionally, the third embodiment of the present disclosure differs from the first embodiment in the process of the display control unit 110 for controlling an image to be output depending on the amount of change occurring at the time of change of display of a stereoscopic image, but other functional configurations are substantially the same as those of the first embodiment, and the detailed description thereof will be omitted. FIG. 11 is a flow chart showing a process of the display control unit 110 of the present embodiment. FIG. 12 is a diagram for describing determination of a rotation angle according to the present embodiment.

3-1. Process for Case where Display of Stereoscopic Image is Changed

FIG. 11 shows, by a flow chart, a process of the display control unit 110 of the information processing apparatus 100 according to the present embodiment. First, the display control unit 110 detects a rotation angle θ (step S301). Next, the display control unit 110 determines whether the rotation angle θ is within a third range expressed by $|θ|>180°−ϵ$ or not (step S303). The ϵ indicates the scope of the third range. Additionally, the values that the ϵ may take will be described later. In the case it is determined here that the rotation angle θ is within the third range, the display control unit 110 interchanges the images to be displayed respectively to the left eye eL and the right eye eR (step S305). The process of the display control unit 110 in step S305 is substantially the same as the process of step S105 in FIG. 6 described in the first embodiment of the present disclosure.

On other hand, in the case it is determined in step S303 that the rotation angle θ is not within the third range, the display control unit 110 next determines whether the rotation angle θ is within a fourth range expressed by $|θ|<ϵ$ or not (step S307). In the case it is determined here that the rotation angle θ is within the fourth range, the display control unit 110 ends the process. On the other hand, in the case it is determined in step S307 that the rotation angle θ is not within the fourth range, the display control unit 110 causes the same image to be displayed to each of the left eye eL and the right eye eR (step S309). The process of the display control unit 110 in step S309 is substantially the same as step S205 in FIG. 10 described in the second embodiment of the present disclosure.

The relationships between the rotation angle θ and images presented to the left eye eL and the right eye eR by the above process will be as summarized in Table 1.

TABLE 1

| Condition for Rotation Angle | Image Presented to Left Eye eL | Image Presented to Right Eye eR |
|---|---|---|
| $|θ|<ϵ$ | image for left eye 200L | image for right eye 200R |
| $|θ|>180°−ϵ$ | image for right eye 200R | image for left eye 200L |
| Others | image for left eye 200L | image for left eye 200L |

The process of the display control unit 110 of the information processing apparatus 100 according to the third embodiment of the present disclosure will be further described with reference to FIG. 12. Determination of the rotation angle θ by the display control unit 110 is shown in FIG. 12. The range illustrated as a range R1 is a range where $|θ|<ϵ$, and corresponds to the fourth range described with reference to FIG. 11. Also, the range illustrated as a range R3 is a range where $|θ|>180°−ϵ$, and corresponds to the third range described with reference to FIG. 11. The ranges illustrated as ranges R2 are ranges not included in the third range and the fourth range described above, and corresponds to ranges falling under the condition shown as "Others" in Table 1.

The range R1 is a range where the rotation angle θ is comparatively small, and owning to correction effected by visual perception, a stereoscopic image that is not unnatural is perceived. Accordingly, in the case the rotation angle θ is within this range, the display control unit 110 causes the image for a left eye 200L and the image for a right eye 200R to be displayed respectively to the left eye eL and the right eye eR in an unchanged manner.

The ranges R2 are ranges where the rotation angle θ is around ±90°, and the relative shift between the image for a left eye 200L and the image for a right eye 200R is larger in the vertical direction than in the horizontal direction. If, in these ranges, the image for a left eye 200L and the image for a right eye 200R are displayed respectively to the left eye eL and the right eye eR in an unchanged manner, there is a possibility that, although not in the state of pseudoscopy, an unnatural impression is given to an observer. Accordingly, the display control unit 110 causes the same image, the image for a left eye 200L in this case, to be displayed to each of the left eye eL and the right eye eR.

The range R3 is a range where the rotation angle θ is around ±180°, and the relative shift between the image for a left eye 200L and the image for a right eye 200R is reversed in the horizontal direction. If, in this range, the image for a left eye 200L and the image for a right eye 200R are displayed respectively to the left eye eL and the right eye eR in an unchanged manner, the state of pseudoscopy is caused, creating a large burden for the observer. Accordingly, the display control unit 110 interchanges the images to be displayed respectively to the left eye eL and the right eye eR.

The ϵ can be obtained as a limit rotation angle θ which, owing to correction effected by visual perception, allows the parallax to not become faulty and a stereoscopic image that is not unnatural to be perceived, in the case the rotation angle θ gradually increased from θ=0°. Such ϵ may be 45°, for example. Furthermore, since the same can be said for a stereoscopic image, in the range R3, where images presented respectively to the left eye eL and the right eye eR are interchanged, the boundary between the range R1 and the range R2 and the boundary between the range R2 and the range R3 are determined, using the same ϵ, to be $|θ|=ϵ$ for the boundary between the range R1 and the range R2 and $|θ|=180°−ϵ$ for the boundary between the range R2 and the range R3. In the case of ϵ=45°, the boundary between the range R1 and the range R2 will be |θ|=45° and the boundary between the range R2 and the range R3 will be |θ|=135°.

3-2. Modified Example

Modified Example 1

Hysteresis Control (1)

The concept of hysteresis may be applied to the operation of the display control unit 110 that is based on the value of a rotation angle θ as described above. Hysteresis means that the state of a system depends on the path up until then. In this case, the display control unit 110 changes a boundary value for changing the images to be displayed respectively to the left eye eL and the right eye eR, depending on in which range the rotation angle θ was in until then. For example, in the example illustrated in FIG. 12, it is conceivable that the display control unit 110 makes the rotation angle θ for changing the images to be displayed respectively to the left eye eL and the right eye eR different for a change direction d1 of the rotation angle θ from the range R1 to the range R2 and for a change direction d2 of the rotation angle θ from the range 2 to the range R1.

Specifically, a case will be described taking an example where ϵ is 45°, that is, the boundary between the range R1 and the range R2 is θ=45° and the boundary between the range R2 and the range R3 is θ=135°. In the case of the change direction d1, the display control unit 110 may, when the rotation angle θ exceeds 45° and becomes 50°, make the images to be displayed respectively to the left eye eL and the right eye eR the same image. Furthermore, in the case of the change direction d2, the display control unit 110 may, when the rotation angle θ falls below 45° and becomes 40°, switch the images to be displayed respectively to the left eye eL and the right eye eR from the same image to the image for a left eye 200L and the image for a right eye 200R. Likewise, in the case of the rotation angle θ changing from the range R2 to the range R3, the display control unit 110 may, when θ becomes 140°, change the images to be displayed respectively to the left eye eL and the right eye eR, and in the case of the rotation angle θ changing from the range R3 to the range R2, the display control unit 110 may, when θ becomes 130°, change the images to be displayed respectively to the left eye eL and the right eye eR.

By performing control in such manner, unnecessary switching of images can be prevented and a natural stereoscopic image can be presented to an observer in a case where, for example, the rotation angle θ increases to an angle slightly exceeding an angle which is a boundary of a range and then decreases to below this angle or the rotation angle θ subtly changes to and fro across an angle which is a boundary of a range.

Modified Example 2

Hysteresis Control (2)

Furthermore, as another example, the display control unit 110 may, when a predetermined time has passed after the rotation angle θ crossed an angle of a boundary of a range, change the images to be displayed respectively to the left eye eL and the right eye eR. For example, the display control unit 110 may, when a time of approximately 500 ms has passed after the rotation angle θ crossed 45° which is the boundary between the range R1 and the range R2, make the images to be displayed respectively to the left eye eL and the right eye eR the same image. When the rotation angle θ further changed and exceeded 135° which is the boundary between the range R2 and the range R2 before a time of approximately 500 ms passed, the display control unit 110 may interchange the images to be displayed respectively to the left eye eL and the right eye eR without making the images to be displayed respectively to the left eye eL and the right eye eR the same image.

By performing control in such manner, images can be prevented from being switched frequently and a natural stereoscopic image can be presented to an observer in a case where, for example, the rotation angle θ increases to an angle exceeding an angle which is a boundary of a range but immediately decreases to below this angle or the rotation angle θ crosses angles of boundaries of a plurality of ranges in a short period of time.

4. Fourth Embodiment

Figure 13:
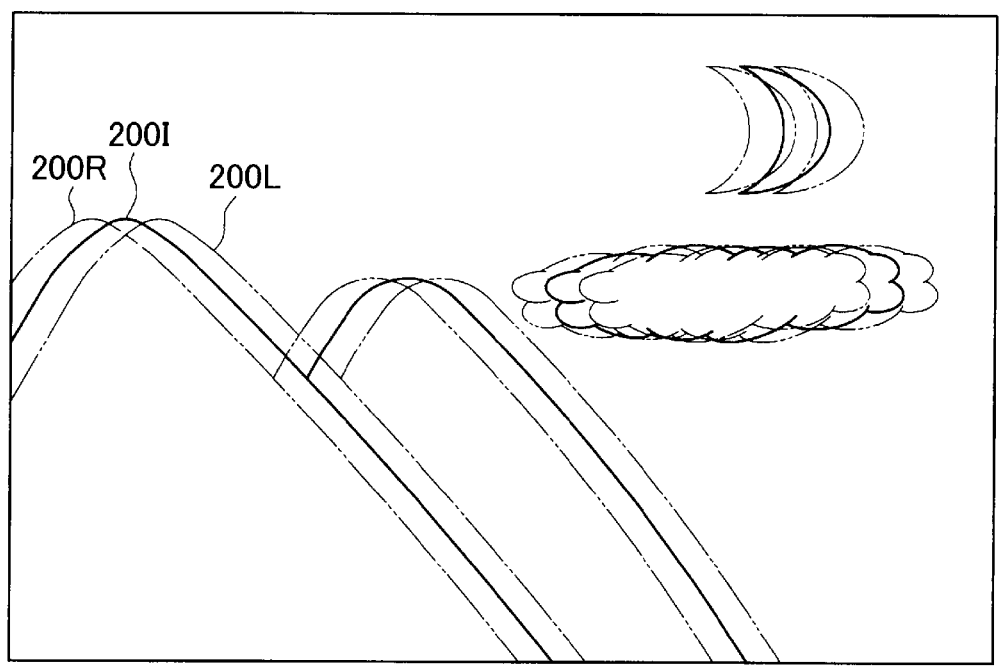
FIG. 13 is an explanatory diagram schematically showing an interpolation image according to a fourth embodiment of the present disclosure.

Next, a fourth embodiment of the present disclosure will be described with reference to FIG. 13. Additionally, the fourth embodiment of the present disclosure differs from the first to third embodiments in that, according to the fourth embodiment, the display control unit 110 displays an interpolation image at the time of changing the images to be displayed respectively to the left eye eL and the right eye eR, but other functional configurations are substantially the same as those of the first to third embodiments, and the detailed description thereof will be omitted. FIG. 13 is a diagram schematically showing an interpolation image displayed in the present embodiment.

FIG. 13 shows, together with the image for a left eye 200L and the image for a right eye 200R, an interpolation image 200I that is displayed by the display control unit 110 of the information processing apparatus 100 in the present embodiment. The display control unit 110 displays, at the time of changing the images to be displayed respectively to the left eye eL and the right eye eR of an observer, the interpolation images 200I between images before change and images after change. The interpolation image 200I may be formed from a single image or may be formed from a plurality of images that are sequentially displayed. Furthermore, in the case the interpolation image 200I is to be displayed for both the left eye eL and the right eye eR, different interpolation images may be displayed for the left eye eL and the right eye eR.

For example, the interpolation image 200I may be generated by linear interpolation between the image for a left eye 200L and the image for a right eye 200R. In this case, for example, any point in the interpolation image 200I is set on a straight line connecting the respective points, corresponding to the point, in the image for a left eye 200L and the image for a right eye 200R. For example, the point at the summit of a mountain in the interpolation image 200I is set on a straight line connecting the point at the summit of a mountain in the image for a left eye 200L and the point at the summit of a mountain in the image for a right eye 200R. The parallax according to the interpolation image 200I generated by the linear interpolation as described above is not necessarily correct. Thus, the duration of display of the interpolation image 200I may be the shortest duration that allows reduction in the feeling of suddenness of switching of images felt by an observer. Such duration may be a duration of about 250 ms, for example.

Furthermore, in the case stereoscopic images input from the decoder 130 are images having depth information or the like as auxiliary information, the display control unit 110 may calculate a parallax that is according to a rotation angle θ using this depth information and may generate the interpolation image 200I based on this parallax. In this case, the parallax according to the generated interpolation image 200I is considered to be correct to a certain degree, and thus the duration of display of the interpolation image 200I may be a longer duration than in the case of the linear interpolation described above. Furthermore, the display control unit 110 may also successively generate the interpolation images 200I according to the change in the rotation angle θ.

Here, as has been described in the first embodiment described above, in the case of interchanging the images to be displayed respectively to the left eye eL and the right eye eR, the display control unit 110 may output the interpolation image 200I to both the left display unit 120L and the right display unit 120R. In this case, the image to be displayed is changed, in the left display unit 120L, from the image for a left eye 200L to the image for a right eye 200R, and the image to be displayed is changed, in the right display unit 120R, from the image for a right eye 200R to the image for a left eye 200L. Accordingly, with the display control unit 110 outputting the interpolation image 200I to both the left display unit 120L and the right display unit 120R, the feeling of suddenness of switching of images felt by an observer can be reduced for both the left eye eL and the right eye eR.

Furthermore, as has been described in the second embodiment described above, in the case of causing the same image to be displayed to each of the left eye eL and the right eye eR, the display control unit 110 may output the interpolation image 200I to either of the left display unit 120L and the right display unit 120R whose image to be displayed is to be changed. In this case, while the image to be displayed will not change for the left display unit 120L, the image to be displayed will be changed for the right display unit 120R from the image for a right eye 200R to the image for a left eye 200L. Accordingly, with the display control unit 110 outputting the interpolation image 200I to the right display unit 120R, the feeling of suddenness of switching of the image felt by an observer can be reduced for the right eye eR.

5. Summary

In the embodiment of the present disclosure described above, the information processing apparatus 100 includes the display control unit 110 that causes the image for a left eye 200L and the image for a right eye 200R to be displayed respectively to the left eye and the right eye of an observer, the image for a left eye 200L and the image for a right eye 200R showing a stereoscopic image, and that interchanges, depending on the amount of change occurring at the time of change of the stereoscopic image, the images to be displayed respectively to the left eye and the right eye of the observer. According to this configuration, even if the positional relationship between the image for a left eye 200L and the image for a right eye 200R is reversed according to the change of display, an appropriate stereoscopic image can be provided to the observer.

Furthermore, the display control unit 110 may, when the amount of change indicates that the relative shift between the image for a left eye 200L and the image for a right eye 200R is reversed in the horizontal direction, interchange the images to be displayed respectively to the left eye and the right eye of the observer. According to this configuration, the stereoscopic image can be prevented from becoming pseudoscopic due to change of display, and an appropriate stereoscopic image can be provided to the observer.

Furthermore, the display control unit 110 may, when the rotation angle θ of the stereoscopic image is within a first range including $(180 \times n)°$ (n is an odd number), interchange the images to be displayed respectively to the left eye and the right eye of the observer. According to this configuration, the amount of change occurring at the time of change of display of the stereoscopic image can be quantitatively acquired as the rotation angle θ, and determination can be made as to whether or not to interchange the images to be displayed respectively to the right eye and the left eye of the observer.

Furthermore, the first range may be $((180 \times n) \pm 45)°$. According to this configuration, determination of the rotation angle θ that takes correction by visual perception into account can be made.

Furthermore, the display control unit 110 may cause the interpolation image 200I to be displayed at the time of interchanging the images to be displayed respectively to the left eye and the right eye of the observer. According to this configuration, the feeling of suddenness of switching of images felt by the observer can be reduced in a case the images to be displayed are changed for both the left eye and the right eye.

Furthermore, the display control unit 110 may cause the same image to be displayed to each of the left eye and the right eye of the observer, depending on the amount of change. According to this configuration, an appropriate image can be provided to the observer even in a case where it is not appropriate, due to the change of display, to provide different images as the image for a left eye 200L and the image for a right eye 200R.

Furthermore, the display control unit 110 may, when the amount of change indicates that the relative shift between the image for a left eye 200L and the image for a right eye 200R is larger in a vertical direction than in a horizontal direction, cause the same image to be displayed to each of the left eye and the right eye of the observer. According to this configuration, an unnatural stereoscopic image can be prevented from being displayed due to the change of display, and an appropriate image can be provided to the observer.

Furthermore, the same image may be the image for a left eye 200L or the image for a right eye 200R. According to this configuration, the same image can be easily prepared.

Furthermore, the display control unit 110 may, when the rotation angle θ of the stereoscopic image is within a second range including $(90 \times m)°$ (m is an odd number), cause the same image to be displayed to each of the left eye and the right eye of the observer. According to this configuration, the amount of change occurring at the time of change of display of the stereoscopic image can be quantitatively acquired as the rotation angle θ, and determination can be made as to whether or not to cause the same image to be displayed to each of the left eye and the right eye of the observer.

The second range may be $((90 \times m) \pm 45)°$. According to this configuration, determination of the rotation angle θ that takes correction by visual perception into account can be made.

The display control unit 110 may display the interpolation image 200I at the time of causing the same image to be displayed to each of the left eye and the right eye of the observer. According to this configuration, the feeling of suddenness of switching of images felt by the observer can be reduced in a case the image to be displayed is changed for one of the left eye and the right eye.

Furthermore, the interpolation image 200I may be generated by linear interpolation between the image for a left eye 200L and the image for a right eye 200R. According to this configuration, the interpolation image 200I can be generated even if the stereoscopic image does not include additional information such as depth information.

Furthermore, the interpolation image 200I may be displayed for 250 ms. According to this configuration, it is possible to display a stereoscopic image with an incorrect parallax generated by linear interpolation for only the shortest duration allowing reduction in the feeling of suddenness of switching of images felt by the observer.

It should be understood by those skilled in the art that various modifications, combinations, sub-combinations and alterations may occur depending on design requirements and other factors insofar as they are within the scope of the appended claims or the equivalents thereof.

For example, in the embodiment described above, the stereoscopic image is assumed to be displayed in a three-dimensional coordinate system having an x-axis, y-axis and a z-axis, but the present disclosure is not limited to such an example. For example, the stereoscopic image may also be displayed in a two-dimensional coordinate system having an x-axis and a y-axis. In this case, the rotation around the z-axis in the explanation of the embodiment described above may be replaced by rotation around an arbitrary point on the coordinate plane.

Furthermore, in the embodiment described above, rotation around the z-axis has been described as an example of the change in display of the stereoscopic image, but the present disclosure is not limited to such an example. For example, the change in display of the stereoscopic image may be rotation around a y-axis or may be reversal that does not involve rotation.

Furthermore, in the embodiment described above, 180° and 90° have been used as the criterion for the rotation angle of the stereoscopic image, but the present disclosure is not limited to such examples. For example, 180° is a criterion for the rotation angle by which the left and right of the stereoscopic image is reversed, and an odd multiple of 180°, such as −180° or 540°, may also be used as the criterion. Also, 90° is a criterion for the rotation angle by which the left and right and the top and bottom of the stereoscopic image are switched, and an odd multiple of 90°, such as −90° or 270°, may also be used as the criterion.

The present disclosure contains subject matter related to that disclosed in Japanese Priority Patent Application JP 2010-194108 filed in the Japan Patent Office on Aug. 31, 2010, the entire content of which is hereby incorporated by reference.

What is claimed is:

1. An information processing apparatus comprising: a stereoscopic display control unit which separately controls an image displayed to a left eye and an image displayed to a right eye of an observer to display a stereoscopic image, and
wherein the stereoscopic display control unit interchanges the image displayed to the left eye and the image displayed to the right eye, depending on an amount of rotational change of the stereoscopic image;
wherein, when a rotation angle of the stereoscopic image is within a first range including $(180 \times n)°$ (n is an odd number), the stereoscopic display control unit interchanges the images to be displayed respectively to the left eye and the right eye of the observer.

2. The information processing apparatus according to claim 1,
wherein, when the amount of rotational change indicates that a relative shift between the image displayed to the left eye and the image displayed to the right eye is reversed in a horizontal direction, the stereoscopic display control unit interchanges the images to be displayed respectively to the left eye and the right eye of the observer.

3. The information processing apparatus according to claim 1,
wherein the first range is $((180 \times n) \pm 45°)$.

4. The information processing apparatus according to claim 1,
wherein the stereoscopic display control unit causes an interpolation image to be displayed at a time of interchanging the images to be displayed respectively to the left eye and the right eye of the observer.

5. The information processing apparatus according to claim 4,
wherein the interpolation image is generated by linear interpolation between the image for a left eye and the image for a right eye.

6. The information processing apparatus according to claim 5,
wherein the interpolation image is displayed for 250 ms.

7. The information processing apparatus according to claim 1,
wherein the stereoscopic display control unit causes a same image to be displayed to each of the left eye and the right eye of the observer, depending on the amount of change in rotation.

8. The information processing apparatus according to claim 7,
wherein, when the amount of rotational change indicates that a relative shift between the image for a left eye and the image for a right eye is larger in a vertical direction than in a horizontal direction, the stereoscopic display control unit causes the same image to be displayed to each of the left eye and the right eye of the observer.

9. The information processing apparatus according to claim 7,
wherein the same image is the image for a left eye or the image for a right eye.

10. The information processing apparatus according to claim 7,
wherein, when the rotation angle of the stereoscopic image is within a second range including $(90 \times m)°$ (m is an odd number), the display control unit causes the same image to be displayed to each of the left eye and the right eye of the observer.

11. The information processing apparatus according to claim 10,
wherein the second range is $((90 \times m) \pm 45°)$.

12. The information processing apparatus according to claim 7,
wherein the stereoscopic display control unit displays an interpolation image at a time of causing the same image to be displayed to each of the left eye and the right eye of the observer.

13. A non-transitory computer-readable medium having embodied thereon a program, which when executed by a processor causes the processor to perform a method, the method comprising:
separately controlling an image displayed to a left eye and an image displayed to a right eye of an observer to display a stereoscopic image; and
interchanging the image displayed to the left eye and the image displayed to the right eye, depending on an amount of rotational change of the stereoscopic image;
wherein, when a rotation angle of the stereoscopic image is within a first range including $(180 \times n)°$ (n is an odd number), the stereoscopic display control unit interchanges the images to be displayed respectively to the left eye and the right eye of the observer.

14. An information processing method comprising:

separately controlling an image displayed to a left eye and an image displayed to a right eye of an observer to display a stereoscopic image; and interchanging the image displayed to the left eye and the image displayed to the right eye, depending on an amount of rotational change of the stereoscopic image;

wherein, when a rotation angle of the stereoscopic image is within a first range including $(180 \times n)°$ (n is an odd number), the stereoscopic display control unit interchanges the images to be displayed respectively to the left eye and the right eye of the observer.

15. The information processing apparatus of claim 1, wherein the stereoscopic display control unit interchanges the image displayed to the left eye and the image displayed to the right eye to prevent an unnatural impression of the image to the observer due to the rotational change of the stereoscopic image.

* * * * *